United States Patent [19]

Priestley

[11] Patent Number: 4,675,653
[45] Date of Patent: Jun. 23, 1987

[54] KEYBOARD ARRANGEMENTS

[76] Inventor: Alan J. Priestley, 74 Hilltop View, Yateley, Nr. Camberley, Surrey, England

[21] Appl. No.: 795,627

[22] Filed: Nov. 6, 1985

[30] Foreign Application Priority Data

Nov. 10, 1984 [GB] United Kingdom ............... 8428442

[51] Int. Cl.⁴ .............................................. G06F 3/02
[52] U.S. Cl. ........................... 340/365 S; 340/365 R; 379/95; 379/369
[58] Field of Search ............ 340/365 R, 365 S, 365 E, 340/711, 712, 715, 636; 364/707, 709, 705; 179/2 D, 2 P, 2 A; 307/64, 65, 66; 315/86

[56] References Cited

U.S. PATENT DOCUMENTS

| | | | |
|---|---|---|---|
| 2,880,372 | 3/1959 | Greppin | 315/86 |
| 4,408,511 | 10/1983 | Deforeit | 340/365 S |
| 4,438,431 | 3/1984 | Toyomura | 340/636 |
| 4,591,833 | 5/1986 | Ishii et al. | 340/365 S |

Primary Examiner—John W. Caldwell, Sr.
Assistant Examiner—Alvin Oberley
Attorney, Agent, or Firm—Lee, Smith & Zickert

[57] ABSTRACT

A keyboard arrangement for computer equipment in which the full set of keys is utilized for computing functions has a restricted set of the full set of keys used for operating a telephony function. The equipment is normally mainspowered, but in the event of mains failure, only the restricted set of keys is scanned by means envisaged from standby battery power, thereby reducing the power required from the battery.

5 Claims, 3 Drawing Figures

KEYBOARD ARRANGEMENTS

This invention relates to keyboard arrangements.

A keyboard provides a plurality of keys to allow an operator to input data into apparatus with which the keyboard is associated. Commonly keyboards are provided with an electronic circuit which detects which key or keys of the keyboard is or are operated.

This invention provides a keyboard arrangement comprising a plurality of keys and means for detecting operation of keys of the said plurality, which means is responsive to a first condition to detect operation of any of the said keys, and is responsive to a second condition to detect operation only of any of the keys in a restricted set of the said plurality.

This arrangement provides more flexibility than the normal arrangement in which operation of any of the keys is detected. Thus, it allows the apparatus of which the keyboard is a part to provide two levels of service, the first requiring the use of keys from the whole plurality and the second requiring only keys from the restricted set.

As one example of a way in which the invention may be used, the first condition may be the supply to the arrangement of power from a first source, there being means responsive to the absence of that supply (the second condition) to supply power to the arrangement from a seocnd source. The first source may then be a normal power source and the second source a standby power source. The restricted set of functions provided in response to operation of keys in just the restricted set could then be those required to provide a desired minimum level of service. Especially in such an arrangement, an element which is required for the scanning only of keys not in the restricted set and which requires a supply of power is preferably connected to receive power from the first source but not the second. This arrangement economises on the consumption of power when the standby source is being used.

An alternative, or additional, reason for providing a restricted level of service is as a security measure. Thus there may be security means, for example, a key-operated switch, for controlling whether the first or the second condition obtains.

In this way the apparatus of which the keyboard is a part can be controlled, through the security means, in such a way as to prevent those facilities corresponding to keys outside the restricted set from being usable.

Preferably the means for detecting operation of keys comprises a first set of conductors, a second set of conductors, each key being arranged when operated to cause a short-circuit between a conductor of the first set and a conductor of the second set, and control means for applying a scanning signal to selected ones of the first set of conductors, which means in response to the first condition applies the scanning signal to each in turn of the conductors of the first set and in response to the second set applies the scanning signal only to the (if one) or each in turn (if more than one) of the conductor or conductors in a restricted sub set of the first set of conductors, which subset consists of the or each conductor of the first set which in operation of any key of the said restricted set of keys is short-circuited to a conductor of the second set, and means for detecting any short circuit between the conductor of the first set to which a scanning signal is applied and any conductor of the second set.

Preferably each conductor of the first set is connected to receive one of a set of parallel outputs from a shift register.

The invention also provides apparatus including a keyboard arrangement according to the invention, which apparatus performs a set of functions in response to depression of keys of the keyboard, the functions performed in response to depression only of keys in the restricted set of keys being a restricted but useful subset of the whole. This subset may, in apparatus providing data-processing and telephony functions, be the ability to carry out dialling of telephone calls in accordance with data entered using the restricted set of keys.

A keyboard arrangement in accordance with the invention will now be described in greater detail by way of example with reference to the accompanying drawings, which show the keyboard arrangement as part of one illustrative piece of equipment in which it may be included, namely a personal workstation with provision for communication over a telephone line.

OUTLINE OF THE SYSTEM

Figure 1:
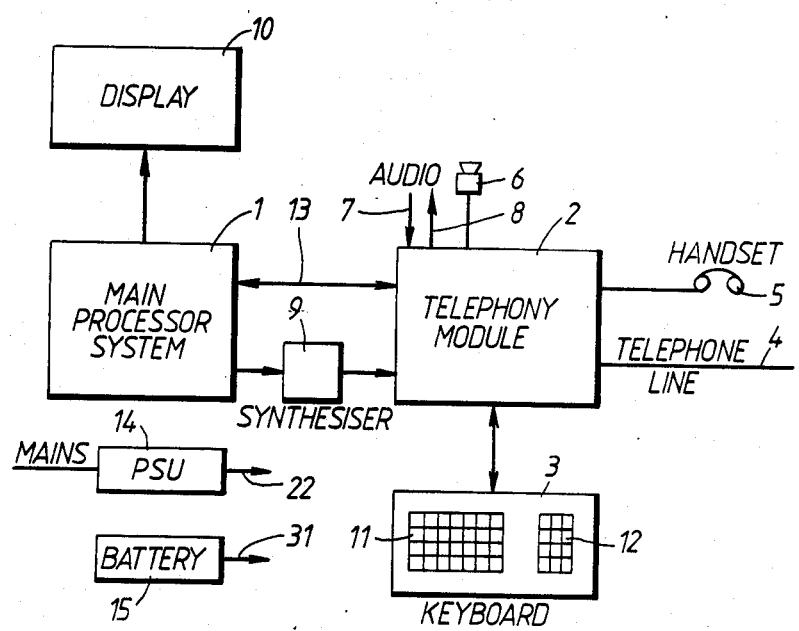
FIG. 1 is a block diagram of the workstation.

Referring to FIG. 1, the principal components of the personal workstation to be described are a main processor system 1 and a telephony module 2. The main processor system 1 is microprocessor-based and executes programs for the user, who controls it through a keyboard 3.

The telephony module 2 is connected to a telephone line 4 onto which it can transfer data from the processor system 1, and from which it can receive data for the processor system 1. The telephony module 2 can also transfer audio signals between the telephone line 4 and a handset 5, thus allowing the user to conduct a voice telephone call. Other possible audio connections from the telephone line 4 are to a loudspeaker 6, an input 7 and output 8 for connection to external audio equipment and a speech synthesiser 9 controlled by the processor system 1.

The main processor system 1 is typically programmed to execute normal data-processing applications programs such as spreadsheet or database programs, and is also programmed to execute various telephony applications using the telephony module 2. Examples can include automatic dialling from a stored directory and automatic answering using the speech synthesiser 9. In addition the main processor system 1 is programmed to carry out data communications over the telephone line 4, for example transfer of messages to or from a similar unit, or to receive and display information from a central viewdata host.

The main processor system displays information on a display 10. In addition there may be connections as desired to other peripherals (not shown) for storage or input and/or output of data.

The keys of the keyboard 3 are arranged in two sections. A section 11 contains the normal character keys in QWERTY layout, together with control keys. A section 12 is a numeric keypad.

In normal operation the telephony module 2 scans the entire keyboard and if it detects that the state of any key has changed (either up or down) transmits a code identifying the change to the main processor system 1. the keyboard and main processor system 1 communicate with each other over a serial interface 13. Any required action, including use of the telephone line 4, is then indicated by the main processor system 1, which can transfer control codes over the interface 1 to the telephony module 2 which then responds as required.

The workstation is normally powered from a power supply unit 14 connected to receive power from the mains. It is isolated from the telephone line 4, as is required by most telephone authorities for such equipment. However, if the mains supply is switched off or cut off the system would then be unable to make or receive normal voice telephone calls, which is inconvenient at any time, and can be dangerous if there is a need to make a call to an emergency service. A battery 15 is therefore provided as a source of standby power. In normal, mains-powered operation all the units are powered. If the mains power is absent the handset 5 is connected to the telephone line 4 and nothing is powered until the handset 5 is lifted from its hook. The battery is connected to the telephony module 2 and parts of the keyboard 3 but not the main processor system 1. The telephony module scans the section 12 of the keyboard (the numeric keypad) but not the section 11. The user then dials his call (if it is outgoing) using the section 12 and the telephony module thereupon transmits the appropriate signals over the line 4. The user conducts his call. Thus operation of the handset as a normal pushbutton voice telephone is possible, but no processing functions are provided by the main processor. By this arrangement, consumption of power in the standby mode is minimised, and the necessary size of the battery is reduced.

Telephony module

Figure 2:
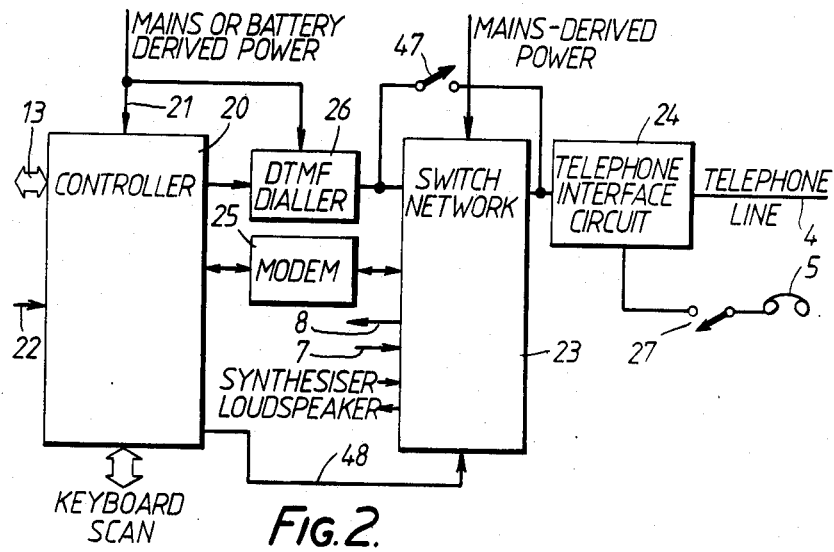
FIG. 2 is a block diagram showing the telephony module of the workstation.

Referring to FIG. 2, the telephony module includes a controller 20. This controller may, for example, be a single-chip microcomputer, which is programmed to carry out the functions to be described in a manner which will be obvious to the man skilled in the art.

The controller 20 communicates with the main processor system 1 over the interface 13, with the controller 20 acting as master. The interface 13 consists of a bidirectional serial data line and control lines to control the direction and timing of the transfer. Such interfaces are well known and will not be described further.

The controller 20 receives a power supply either from the power supply unit 14 or the standby battery 15 over a line 21. It also receives a signal over a line 22 connected to the output of the power supply unit 14. This input allows the controller 20 to determine which power condition obtains, that is, whether the power is from the power supply unit 14 or the battery 15.

A switch matrix 23 consisting of multiplexers powered from the mains operated power supply unit 14 is controlled by controller 20 over connection 48 and allows various connections to be made to a telephony interface circuit 24 connected to the telephone line 4. These connections include the supply of data in modulated form to or from a modem 25 and connections to the various other audio inputs and outputs 6 to 9. They also include a possible connection to a dual-tone multi-frequency dialler circuit 26 if this is the dialling technique used. An optional second telephone line (not shown) may also be connected through its own telephony interface circuit to the switch matrix 23 for connection to the various possible outlets.

The telephony interface circuit 24 provides, under the control of the controller 20 a suitable connection between the telephone line 4 and either the switch matrix 23 or the handset 5, which is connected to the telephony interface circuit 24 through a relay 27 also under the control of the controller 20. If the telephony interface circuit 24 detects ringing it indicates that fact to the controller 20.

In the normal, mains-powered operation the controller 20 repeatedly scans the whole keyboard 3 and transmits codes defining any change of key state (up or down) to the main processor system 1. This action is the only one the controller carries out autonomously in this mode of operation; every other type of action is carried out in response to control codes from the main processor system, including setting up the switch matrix for a telephone call and dialling the call. Even for a manually dialled call the dialling data is sent to the main processor unit and then returned.

In the absence of mains supply, if the handset 5 is on-hook no power is present even from the battery. When the handset is lifted, to make an outgoing call or because ringing has been detected, off-hook battery power is supplied to the controller 20 and it carries out an initialisation routine. On detecting from the line 22 that mains power is absent (i.e. that it is in battery-powered mode) it operates the relay in the telephony interface circuit so as to bring the line 4 into the holding condition corresponding to an off-hook state for the handset 5. It then scans just the section 12 (numeric pad) of the keyboard. This scan also includes various switches which are set to indicate the required type of dialling. Using the information gained from these switches it then dials the call using the appropriate dialling technique if outgoing, and treating the numeric keypad as the keypad of a push-button telephone.

Scanning circuit

Figure 3:
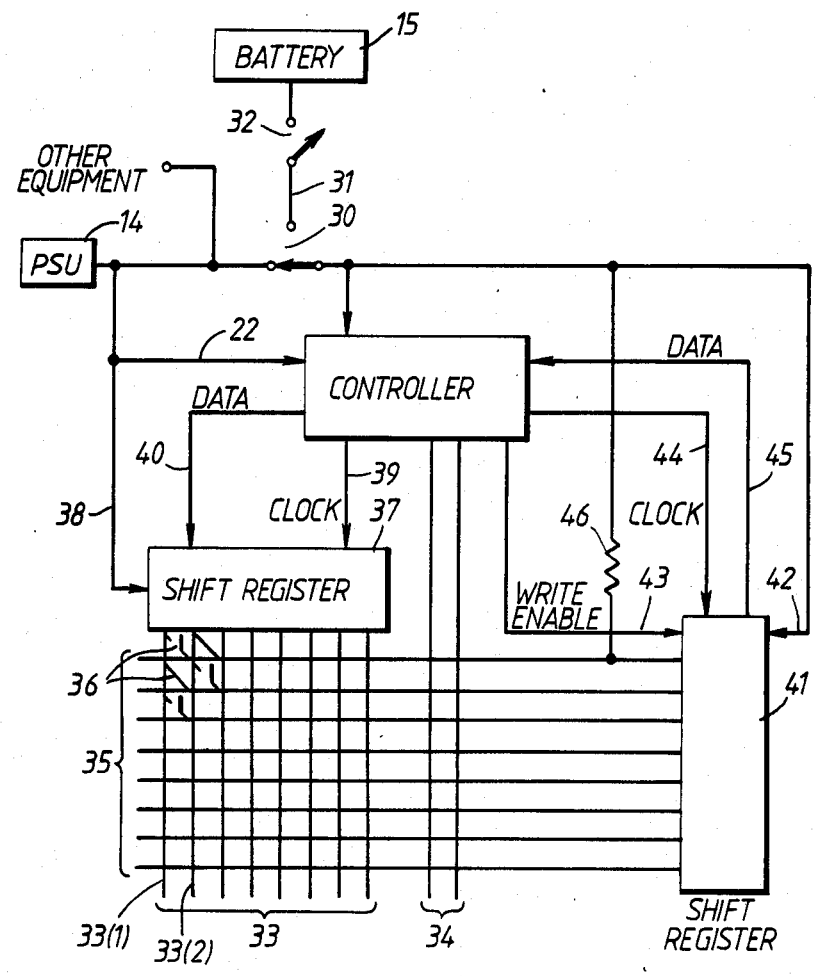
FIG. 3 is a diagram showing the scanning arrangement for the keyboard of the workstation.

Referring to FIG. 3, if mains power is present, the supply from the power supply unit 14 is supplied to all the elements of the system. The supply to those elements that will be powered in battery mode is through a relay 30 which, in the presence of mains power, passes on the supply from the unit 14. However, in the absence of mains power, the relay 30 makes a connection to a line 31 to the battery 15. This line includes a switch 32 which is normally open, but is closed when the handset 5 is lifted. Power from the battery 15 is then supplied through the relay 30 to, among other elements, the controller 20. As has been explained, the controller 20 also receives an input on a line 22 to indicate the source of power; this line is connected to the power supply unit 14 upstream of the relay 30.

In order to scan the keys there are provided two sets of conductors, column conductors arranged in two sets, 33 and 34, and row conductors 35. Each key is situated at the crossing of a row conductor and a column conductor, and depression of the key closes a normally open switch 36 of which there is one per key, to make a short-circuit between the two conductors. The keys of the section 12 (numeric keypad) and the presettable switches indicating the dialling mode to be used are the keys that are associated with the set 34 of column conductors; the keys of the section 11 are associated with the set 33 of column conductors. It will be realised that the matrix of key switches as defined by the row and column conductors will not necessarily reproduce the actual layout of the keys. As examples of suitable numbers, there may be eight row conductors 35, eight column conductors 33 and two column conductors 34.

The column conductors 33 are connected to the outputs of a serial-in parallel-out shift register 37. This register is powered from the power supply unit 14 on a line 38 and is unpowered if the power supply unit 14 is in operation. The controller 20 clocks the register 37 over a line 39 and supplies its serial input over a line 40.

The column conductors 34 are connected directly to separate outputs from the controller 20.

The row conductors 35 are each connected to one of the inputs of a parallel-in serial-out shift register 41. This register is powered from the output of the relay 30 over a line 42 and is therefore powered even in battery mode.

The controller 20 supplies a write-enable signal to the register 41 over a line 43 and a signal to clock data out over a line 44. It receives the outputted serial data over a line 45.

Each row conductor 35 is connected to the power supply (whether battery or mains) through a pull-up resistor 46, of which only one is shown.

The operation of the scanning circuit will now be described, first for the mains-powered mode.

As has been explained, in this mode the controller 20 scans the entire keyboard. The scan is carried out repeatedly, and each cycle of the scan starts with the shift register 37 loaded in all positions with the binary value corresponding to a high output. This value will be designated 1 in this description. The controller 20 then clocks a 0 into the position corresponding to the outermost column conductor 33(1) say.

The 1s already held will be shifted one place and 0s will still lead to 1s being output from the remaining positions. 1s are also output on the lines 34.

Outputting a 0 on a column conductor is, on the convention chosen, equivalent to setting it low. If the switch 36 associated with the crossing between it and a row conductor 35 is closed (because the corresponding key is depressed) current will be drawn through that row conductor and its pull-up resistor 46. The input to the shift register 41 will therefore go low and will be entered as a 0 (on the convention chosen). If on the other hand the switch is open, the voltage at the input will stay high and be entered as a 1. It will be realised that the state of switches on column conductors connected to a 1 output will not affect this result - whether open or closed they cause a 1 to be entered.

With a 0 output onto the first column conductor 33(1), then, a write-enable signal on the line 43 causes the state of each key in the first column to be written into the register 41, with depressed keys represented by 0s. The contents of the register 41 are shifted into the controller 20, which stores them in a section of memory mapping the state of the keys.

The controller 20 then continues its scan by inserting a 1 into the register 37 and shifting its contents so that the 0 is now output onto the next column conductor, 33(2) say, and the process is repeated. When the 0 has been scanned across the conductors 33 the register 37 is filled with 1s and the conductors 34 are scanned by outputting a 0 to each in turn. In this way the entire state of the keyboard is mapped.

In the mains-powered mode the controller 20 encodes any changes in the known manner and transmits the codes to the main processor.

In the battery-powered mode the shift register 37 is unpowered and its outputs open-circuited. Any attempt to scan the conductors 33 will be ineffective and is omitted (though if desired, for simplicity, the controller 20 could continue to produce the outputs corresponding to this scan). The conductors 34 are scanned, in the manner described above, and the state of the section 112 of the keyboard entered into the controller 20 via the shift register 41, which is powered even in this mode. The controller then treats the data entered as dialling data in the manner described with reference to FIG. 2.

Powering the shift register 37 from the mains and connecting the conductors 34 directly to the controller 20 reduces the number of circuits that must be powered in the battery mode and therefore the demands on the battery.

The DTMF dialler 26 is normally connected through the switch matrix 23 to the telephony interface circuit 24, but in battery-powered mode is connected directly to the telephony interface circuit 24 through a relay 47 normally held open when power is from the mains.

Modifications

If desired, in the battery-powered mode battery battery power may be supplied to the register 37 as well as the register 41. In this case the scan in the battery-powered mode must be restricted to just the conductors 34. A switch could be included in the output or input of the power supply unit 14 to be operated by a lock-and-key mechanism. This would allow, for example, the normal user of the workstation to prevent its use for processing while not disabling the telephone.

The technique of disabling part of the scan could be provided for other types of equipment with which it is desired to provide two levels of service, for example, point-of-sale equipment. In this case, power can be supplied by two routes from the same source to correspond to the mains and battery in the arrangement described. Alternatively, instead of changing the powering arrangement the scan pattern could simply be restricted.

I claim:

1. A keyboard arrangement including a keyboard and associated apparatus for receiving input data from the keyboard, the keyboard comprising a first set of keys and a second set of keys;
   - a main power source for supplying power to the arrangement during normal operation;
   - first scanning means operable only during said normal operation to scan and detect the operation of any of the keys in said first and second sets, the first scanning means being rendered operative by a signal derived from the main power source;
   - a standby power source for supplying power to the arrangement in the event of interruption of the power from the main power source, and
   - second scanning means operable only when the standby power source is in operation to scan and detect the operation of any of the keys in said second set only, the second scanning means being rendered operative by the absence of said signal when power from the main power source is interrupted.

2. A keyboard arrangement as claimed in claim 1, in which said standby power source includes a battery.

3. A keyboard arrangement as claimed in claim 2, in which said standby power source supplies power to selected parts of the apparatus only thereby reducing the power consumption of the arrangement.

4. A keyboard arrangement as claimed in claim 1, in which said first set of keys provides alphabetical characters and said second set of keys provides numerical characters.

5. A keyboard arrangement as claimed in claim 4, including a security switch activated by a lock and key and operable to interrupt the power from the main power source to cause the standby power source to come into operation thereby providing a security facility in which only the numerical keys are operable.

* * * * *